(12) United States Patent
Wang et al.

(10) Patent No.: US 6,385,672 B1
(45) Date of Patent: *May 7, 2002

(54) SYSTEM TO OPTIMIZE PACKET BUFFER UTILIZATION VIA SELECTIVELY PARTITIONED TRANSMIT AND RECEIVE BUFFER PORTIONS

(75) Inventors: Chi-Lie Wang, San Jose; Richard S. Reid, Mountain View, both of CA (US)

(73) Assignee: 3Com Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/879,406

(22) Filed: Jun. 20, 1997

Related U.S. Application Data (63) Continuation-in-part of application No. 08/866,822, filed on May 30, 1997, now Pat. No. 6,128,715.

(51) Int. Cl.$^7$ .............................................. G06F 12/02
(52) U.S. Cl. ........................... 710/56; 710/52; 710/130; 711/173
(58) Field of Search ................................ 709/215, 250; 710/129, 130, 52, 56, 53; 711/173

(56) References Cited

U.S. PATENT DOCUMENTS

| | | | | |
|---|---|---|---|---|
| 5,046,039 A | * | 9/1991 | Ugajin et al. ................. | 710/56 |
| 5,812,775 A | * | 9/1998 | Van Seters et al. .......... | 709/213 |
| 5,838,994 A | * | 11/1998 | Valizadeh .................... | 710/56 |
| 5,860,119 A | * | 1/1999 | Dockser ....................... | 711/156 |
| 5,916,309 A | * | 6/1999 | Brown et al. ................. | 710/52 |
| 5,920,732 A | * | 7/1999 | Riddle .......................... | 710/56 |
| 5,954,794 A | * | 9/1999 | Fishler et al. ............... | 709/213 |
| 6,094,695 A | * | 7/2000 | Kornher ....................... | 710/56 |

* cited by examiner

Primary Examiner—Do Hyun Yoo
Assistant Examiner—Gary J. Portka
(74) Attorney, Agent, or Firm—McDonnell Boehnan Hulbert & Berghoff

(57) ABSTRACT

The present invention provides a device which facilitates communications between a computer system and a data network by buffering data in transit between the computer system and the data network in a single buffer memory which can be flexibly partitioned into separate transmit and receive buffers. This flexible partitioning allows the relative sizes of the transmit and receive buffers to be optimized across a wide range of buses, data networks and network usage patterns. The transmit and receive buffers are structured as ring buffers within respectively allocated portions of the buffer memory. The buffer memory is controlled by a simple finite state machine controller, which is free from the performance impediments and higher cost associated with a microprocessor-based controller. The present invention also provides support for retransmission of packets that encounter transmission problems such as collisions during transmissions on the data network. The present invention additionally provides the ability to discard incomplete packets.

8 Claims, 9 Drawing Sheets

FIGURE 4

| memSIZE[1:0] | memPartition[2:0](Tx:Rx) | memFreeSpace[15:0](Tx:Rx) | sizemask[15:0](Tx:Rx) |
|---|---|---|---|
| 00 = 8K | 000 = 1:3 (2K:6K) | 2K - 1(16'h07FF) : 6K - 1 (16'h17FF) | 16'h07FF : 16'h1FFF |
|  | 001 = 3:5 (3K:5K) | 3K - 1(16'h0BFF) : 5K - 1 (16'h13FF) | 16'h0FFF : 16'h1FFF |
|  | 010 = 1:1 (4K:4K) | 4K - 1(16'h0FFF) : 4K - 1 (16'h0FFF) | 16'h0FFF : 16'h0FFF |
|  | 011 = 5:3 (5K:3K) | 5K - 1(16'h13FF) : 3K - 1 (16'h0BFF) | 16'h1FFF : 16'h0FFF |
|  | 100 = 3:1 (6K:2K) | 6K - 1(16'h17FF) : 2K - 1 (16'h07FF) | 16'h1FFF : 16'h07FF |
| 01 = 32K | 010 = 1:1 (16K:16K) | 16K - 1(16'h3FFF) : 16K - 1 (16'h3FFF) | 16'h3FFF : 16'h3FFF |
| 10 = 64K | 000 = 1:3 (16K:48K) | 16K - 1(16'h3FFF) : 48K - 1 (16'hBFFF) | 16'h3FFF : 16'hFFFF |
|  | 001 = 3:5 (24K:40K) | 24K - 1(16'h5FFF) : 40K - 1 (16'h9FFF) | 16'h7FFF : 16'hFFFF |
|  | 010 = 1:1 (32K:32K) | 32K - 1(16'h7FFF) : 32K - 1 (16'h7FFF) | 16'h7FFF : 16'h7FFF |
|  | 011 = 5:3 (40K:24K) | 40K - 1(16'h9FFF) : 24K - 1 (16'h5FFF) | 16'hFFFF : 16'h7FFF |
|  | 100 = 3:1 (48K:16K) | 48K - 1(16'hBFFF) : 16K - 1 (16'h3FFF) | 16'hFFFF : 16'h3FFF |
| 11 = 128K | 010 = 1:1 (64K:64K) | 64K - 1(16'hFFFF) : 64K - 1 (16'hFFFF) | 16'hFFFF : 16'hFFFF | bufUsedSpace = (WritePtr[15:0] - ReadPtr[15:0]) & sizeMask

BufEmpty = (bufUsedSpace == 0)

bufFreeSpace = maxFreeSpace - bufUsedSpace bufFull = (bufFreeSpace[15:2] == 0) // same as bufFreeSpace <=3

| memSIZE[1:0] | memPartition[2:0](Tx:Rx) | mod[2:0](Tx:Rx) | large | memAddr[15:0] |
|---|---|---|---|---|
| 00 = 8K | 000 = 1:3 (2K:6K)<br>001 = 3:5 (3K:5K)<br>010 = 1:1 (4K:4K)<br>011 = 5:3 (5K:3K)<br>100 = 3:1 (6K:2K) | 001 : 101<br>010 : 100<br>011 : 011<br>100 : 010<br>101 : 001 | false<br>false<br>false<br>false<br>false | [000,ptr[18:16],ptr[9:0]] |
| 01 = 32K | 010 = 1:1 (16K:16K) | - | - | [00,ptr[13:0]] |
| 10 = 64K | 000 = 1:3 (16K:48K)<br>001 = 3:5 (24K:40K)<br>010 = 1:1 (32K:32K)<br>011 = 5:3 (40K:24K)<br>100 = 3:1 (48K:16K) | 001 : 101<br>010 : 100<br>011 : 011<br>100 : 010<br>101 : 001 | true<br>true<br>true<br>true<br>true | (ptr[18:16],ptr[12:0]) |
| 11 = 128K | 010 = 1:1 (64K:64K) | - | - | ptr[15:0] |

FIGURE 12

SYSTEM TO OPTIMIZE PACKET BUFFER UTILIZATION VIA SELECTIVELY PARTITIONED TRANSMIT AND RECEIVE BUFFER PORTIONS

RELATED APPLICATION

This application is a continuation-in-part of a U.S. patent application, entitled "Asynchronous Transmit Packet Buffer," by inventors Chi-Lie Wang and Ngo Thanh Ho, having Ser. No. 08/866,822 and a filing date of May 30, 1997, now U.S. Pat. No. 6,128,715. This application hereby incorporates by reference the above-referenced patent application.

BACKGROUND

1. Field of the Invention

The present invention relates to a device for connecting a computer system to a packet-switched data network, such and more particularly to the design of a system that optimizes utilization of a packet buffer within the device for storing packets in transit between the computer system and the packet-switched data network.

2. Related Art

The advent of computer networking has given rise to a number of devices that connect computer systems to packet-switched data networks, such as the Internet. These devices typically include interfaces to the computer system and the data network, as well as a buffer memory, for buffering packets of data in transit between the computer system and the data network. This buffer memory allows data to be downloaded from a host computer system when the host computer system is able to do so, and subsequently transmitted across the data network when the data network can accommodate a transmission, thereby increasing the overall efficiency of communications by the computer system across the data network.

There are typically two buffers in such a network interface device: a transmit buffer for storing data from the computer system to be transmitted onto the data network, and a receive buffer, for receiving data from the data network to be transmitted to the computer system.

In order to optimize the performance of the buffer memory, it is desirable to achieve the proper balance between memory used for the transmit buffer and memory used for the receive buffer. This is complicated by the fact that the optimal transmit and receive buffer sizes can vary widely between different buses, data networks, and network traffic patterns. It is also desirable to minimize buffer underrun and buffer overrun. Buffer overrun occurs when the buffer becomes overly full before packets can be removed from the buffer. Buffer underrun occurs when the buffer becomes empty and data continues to be transmitted from the empty buffer.

These transmit and receive buffers are typically controlled by a controller, which can take the form of a microprocessor. A microprocessor-based controller can access packets in the transmit and the receive buffers using memory mapping which has the advantage that data in the buffers can be flexibly accessed. However, the speed of accesses to the buffer are limited by the microprocessor speed, and hence can be relatively slow. Microprocessors can also be quite expensive, adding significantly to the cost of a network interface card (NIC).

Network interface devices are typically implemented using separate transmit and receive buffers, which are of a fixed size that cannot be varied to meet the requirements of different buses, data networks and network traffic patterns.

What is needed is a system for flexibly allocating buffer memory in a network interface device between transmit and receive buffers in order to optimize performance for the network interface device across a wide range of buses, data networks and network usage patterns.

Additionally what is needed is a low-cost system for controlling the operation of the buffer memory, that is free from the low performance and the high cost of a microprocessor-based controller.

SUMMARY

The present invention provides a device which facilitates communications between a computer system and a data network by buffering data in transit between the computer system and the data network in a single buffer memory which can be flexibly partitioned into separate transmit and receive buffers. This flexible partitioning allows the relative sizes of the transmit and receive buffers to be optimized across a wide range of buses, data networks and network usage patterns. The transmit and receive buffers are structured as ring buffers within respectively allocated portions of the buffer memory. The buffer memory is controlled by a simple finite state machine controller, which is free from the performance impediments and higher cost associated with a microprocessor-based controller. The present invention also provides support for retransmission of packets that encounter transmission problems such as collisions during transmissions on the data network. The present invention additionally provides the ability to discard incomplete packets.

One embodiment of the present invention is an apparatus for transmitting data between a first communication channel and a second communication channel. The apparatus comprises a first interface, coupled to the first communication channel, and a second interface coupled to the second communication channel. The apparatus also includes a buffer memory, coupled to the first communication channel and the second communication channel, the buffer memory being selectively partitionable so that a portion of the buffer memory of selectable size is allocated to a transmit buffer for buffering data to be transmitted on the first communication channel, and a portion of the buffer is allocated to a receive buffer of selectable size for buffering data received from the first communication channel. The apparatus also includes a controller, coupled to the buffer memory, for controlling data flowing through the transmit buffer and the receive buffer.

According to one aspect of the present invention, the controller does not include a microprocessor.

According to another aspect of the present invention, the apparatus includes a plurality of pointer registers coupled to the buffer memory, for storing pointers for accessing the transmit and receive buffers, and at least one logic circuit coupled to the plurality of registers, for performing arithmetic operations on the plurality of pointer values stored in the plurality of pointer registers.

One embodiment is an apparatus for buffering packet data in first in first out order, comprising: a buffer; a write pointer coupled to the buffer, for pointing to a location where packet data is being written into the buffer; a start of a read packet pointer coupled to the buffer, for pointing to the start of a read packet being read from the buffer, and a read pointer coupled to the buffer, for pointing to a location where packet data is being read from the packet being read, the read pointer being resettable to point back to a location stored in the start of read packet pointer to facilitate retransmission of the read packet when a transmission error takes place.

According to an aspect of this embodiment, the apparatus includes a start of write packet pointer coupled to the buffer, for pointing to the start of the packet being written into the buffer. It also includes resources coupled to the write pointer, for resetting the write pointer to point back to a location stored in the start of write packet pointer, to facilitate discarding of an incomplete packet.

According to another aspect of the present embodiment, the apparatus includes an end of read packet pointer, coupled to the buffer, for pointing to the end of a packet being read; and resources coupled to the read pointer, for comparing the read pointer with the end of read packet pointer, to determine when the packet is completely read.

Another embodiment is as an apparatus for performing pointer arithmetic for a pointer into a buffer, the pointer arithmetic including a pointer incrementing operation that increments a first pointer until it reaches a selectable maximum value and then returns to a starting value, comprising: a first pointer input, for receiving the first pointer; a selectable maximum value input, for indicating a selectable maximum value of the output for purposes of setting the output to the starting value during a pointer increment operation that exceeds the selectable maximum value; an output, for outputting the result of a pointer arithmetic operation, and a logic circuit, coupled to the first input, the selectable maximum value input and the output, which includes circuitry that increments the first pointer to produce the output, such that if the value of the first pointer after incrementing exceeds the selectable maximum value, the output is set to the starting value.

According to an aspect of the present embodiment, the apparatus includes a second pointer input coupled to the logic circuit, for receiving one of a second pointer value and an operand, wherein the logic circuit includes circuitry to perform an operation between the first pointer input and the second pointer input to produce the output.

Other aspects and advantages of the present invention can be seen upon review of the figures, the description, and the claims which follow.

DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
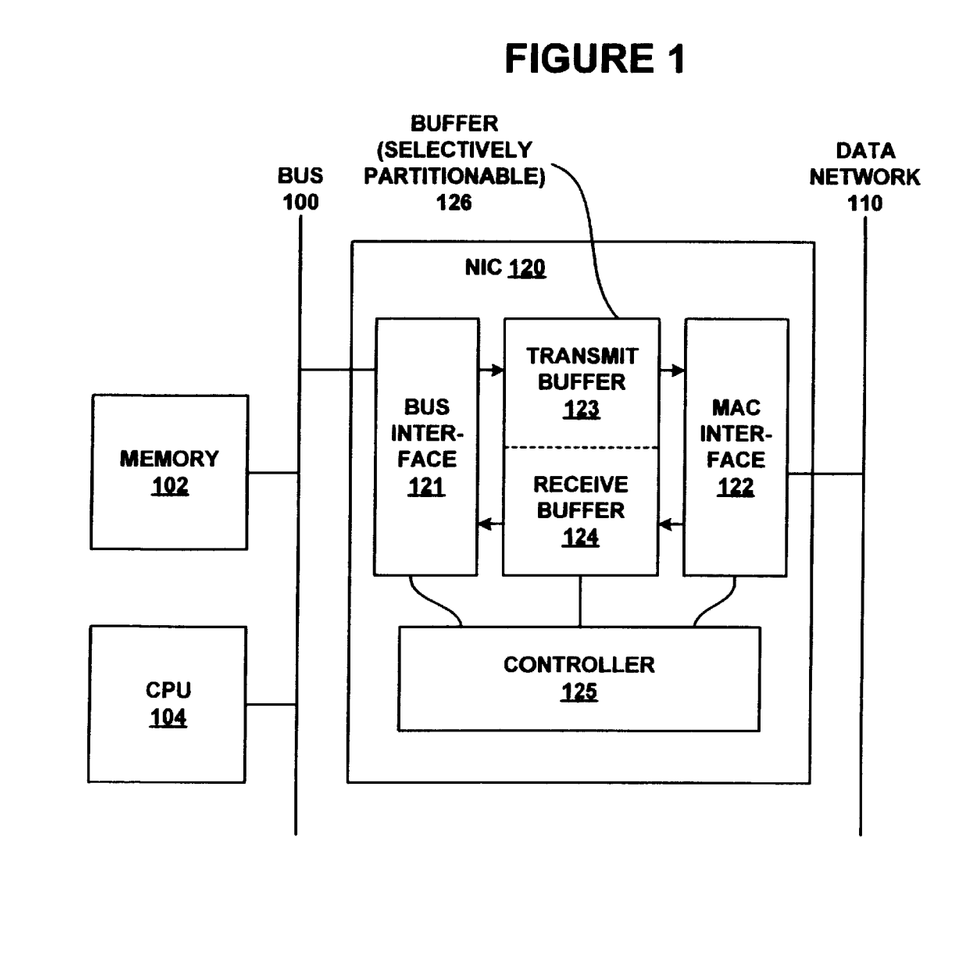
FIG. 1 is a block diagram illustrating some of the major functional components of a device for connecting a computer system to a packet-switched data network in accordance with an aspect of the present invention.

FIG. 1 is a block diagram illustrating some of the major functional components of a device for connecting a computer system to a data network in accordance with an aspect of the present invention. The computer system comprises CPU 104 which is linked to memory 102 through bus 100. CPU 104 may be any type of central processing unit, including a device controller, a microprocessor or a mainframe computer system. Memory 102 is any type of memory device including a random access memory and a magnetic storage device. Bus 100 is any type of bus that can be used to connect computer system components together, including peripheral component interconnect (PCI), extent industry-standard architecture (EISA), and industry standard architecture (ISA) buses. Bus 100 connects to data network 110 through network interface card 120.

Data network 110 is any type of packet-switched data network, including Ethernet, token ring, and fiber distributed data interface (FDDI) networks.

Network interface card (NIC) 120 includes bus interface 121, receive buffer 123, media access control (MAC) interface 122, transmit buffer 124 and controller 125. Bus interface 121 is coupled to bus 100, and provides bus interface functions for communications across bus 100. Bus interface 121 is coupled to transmit buffer 124 and receive buffer 123, and data flows between bus 100 and buffers 123 and 124 through bus interface 121. Receive buffer 123 and transmit buffer 124 comprise memory 200. MAC interface 122 is coupled to data network 110, and it provides MAC layer interface functions for communications across data network 110. MAC interface 122 additionally connects to transmit buffer 124, to which it writes data, and also connects to receive buffer 123 from which it reads data. Controller 125 is coupled to bus interface 121, memory 200 and MAC interface 122. Controller 125 coordinates the activities of bus interface 121, memory 200 and MAC interface 122 in such a way as to facilitate the transfer of data between bus 100 and data network 110. In one embodiment, controller 125 is a DMA device, which is capable of writing to and reading from memory 102 across bus interface 121 and bus 100. In another embodiment, controller 125 is implemented using a standard cell ASIC, and does not include a microprocessor.

The circuit illustrated in FIG. 1 generally operates as follows. In the transmit direction, data is transferred from memory 102 through bus 100 and bus interface 121 to transmit buffer 124 within memory 200. This transfer is accomplished either by CPU 104, or alternatively by the DMA circuitry within controller 125. Data within transmit buffer 124 is then transmitted through MAC interface 122 and data network 110 to an ultimate destination on a remote host coupled to data network 110. In the receive direction, data is received from data network 110 through MAC interface 122 into receiver buffer 123. Data is then transferred from receiver buffer 123 through bus interface 121 and bus 100 into memory 102 under control of controller 125. Note that data transferred between bus 100 and data network 110 is in the form of packets, including a header portion containing addressing information, and a data portion containing the data to be transferred.

Figure 2:
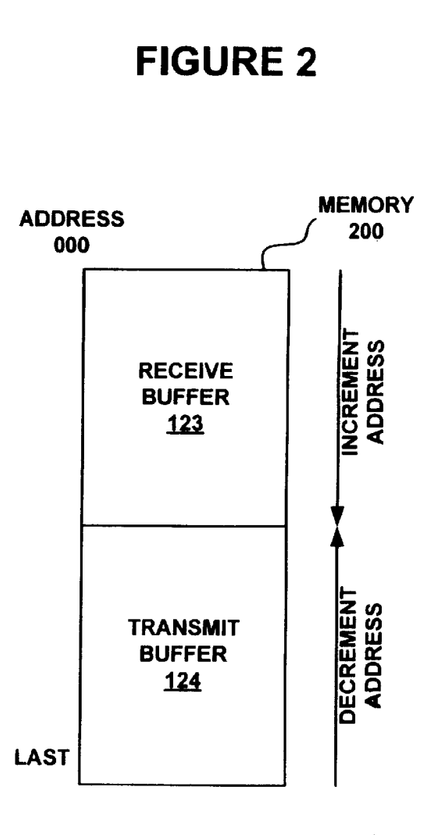
FIG. 2 is a diagram illustrating how memory 200 is partitioned between receive buffer 123 and transmit buffer 124 in accordance with an aspect of the present invention.

FIG. 2 is a diagram illustrating how memory 200 is partitioned between receive buffer 123 and transmit buffer 124 in accordance with an aspect of the present invention. As can be seen in FIG. 2, receive buffer 123 begins at address 000 and proceeds through increasing addresses to the boundary between receive buffer 123 and transmit buffer 124. In contrast, transmit buffer 124 starts at a "last" address of memory 200 and proceeds through decreasing addresses to the boundary between transmit buffer 124 and receive buffer 123. Memory 200 is selectively partitionable between receive buffer 123 and transmit buffer 124 along block boundaries. For example, if memory 200 includes 8K bytes of memory divided into 1K blocks, then memory 200 can be partitioned so that receive buffer 123 and transmit buffer 124 are allocated in the following proportions: (2K, 6K), (3K, 5K), (4K, 4K), (5K, 3K) and (6K, 2K). The partitioning that is desired is selected either using a hardware jumper or through software at system boot up time.

Figure 3:
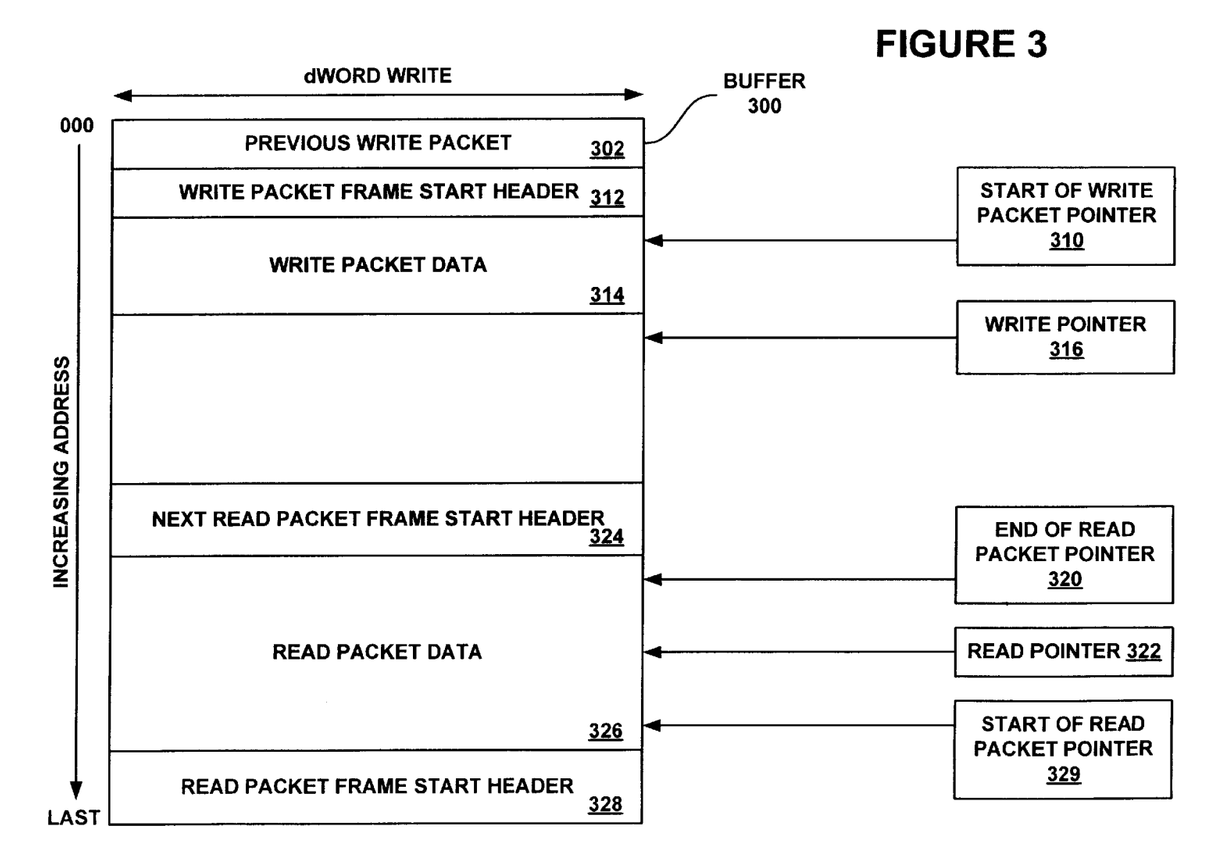
FIG. 3 is a diagram illustrating the structure of a buffer in accordance with an aspect of the present invention.

FIG. 3 is a diagram illustrating the structure of a buffer including the various pointers used to access the buffer in accordance with an aspect of the present invention. Buffer 300 contains previous write packet 302, write packet frame start header 312, write packet data 314, read packet frame start header 324, read packet data 326 and next read packet frame start header 328. Write packet frame start header 312 and write packet data 314 comprise a write packet, which is the current packet being written to in buffer 300. Read packet frame start header 324 and read packet data 326 comprise a read packet, which is a packet presently being read from in buffer 300. Note that a frame start header portion of a packet contains addressing and control information, whereas a data portion of a packet contains the actual data to be transmitted in the packet.

Buffer 300 is accessed through a plurality of pointers, including start of write packet pointer 310, write pointer 316, start of read packet pointer 320, read pointer 322 and end of read packet pointer 329.

Write pointer 316 points to the location where data is currently being written to within buffer 300. When a runt packet is encountered (which is a packet that is shorter than the minimum length for a packet) write pointer 316 is reset so that it points to a location contained within start of write packet pointer 310, so that write pointer 316 points to the beginning of write packet frame start header 312. In this way, a packet that is received in improper form is discarded.

Read pointer 322 points to a location within read packet data 326 where data is currently being read from buffer 300. When a transmission error occurs, read pointer 322 is reset so that it points to a location contained within start of read packet pointer 320. Start of read packet pointer 320 points to the beginning of the data portion of a packet currently being read. In this way, read pointer 322 can be reset so that retransmission of the data within the packet currently being read can take place without having to retrieve the data again from its source. Read pointer 322 proceeds through read packet data 326 until the value contained within read pointer 322 matches the value contained in end of read packet pointer 329. End of read packet pointer 329 points to the end of the packet currently being read.

The pointers are constrained in a number of ways. Write pointer 316 cannot proceed past the location of read pointer 322. Otherwise, a buffer overflow will occur. Correspondingly, read pointer 322 cannot proceed past the location of write pointer 316. Otherwise, a buffer underrun will take place.

Figure 4:
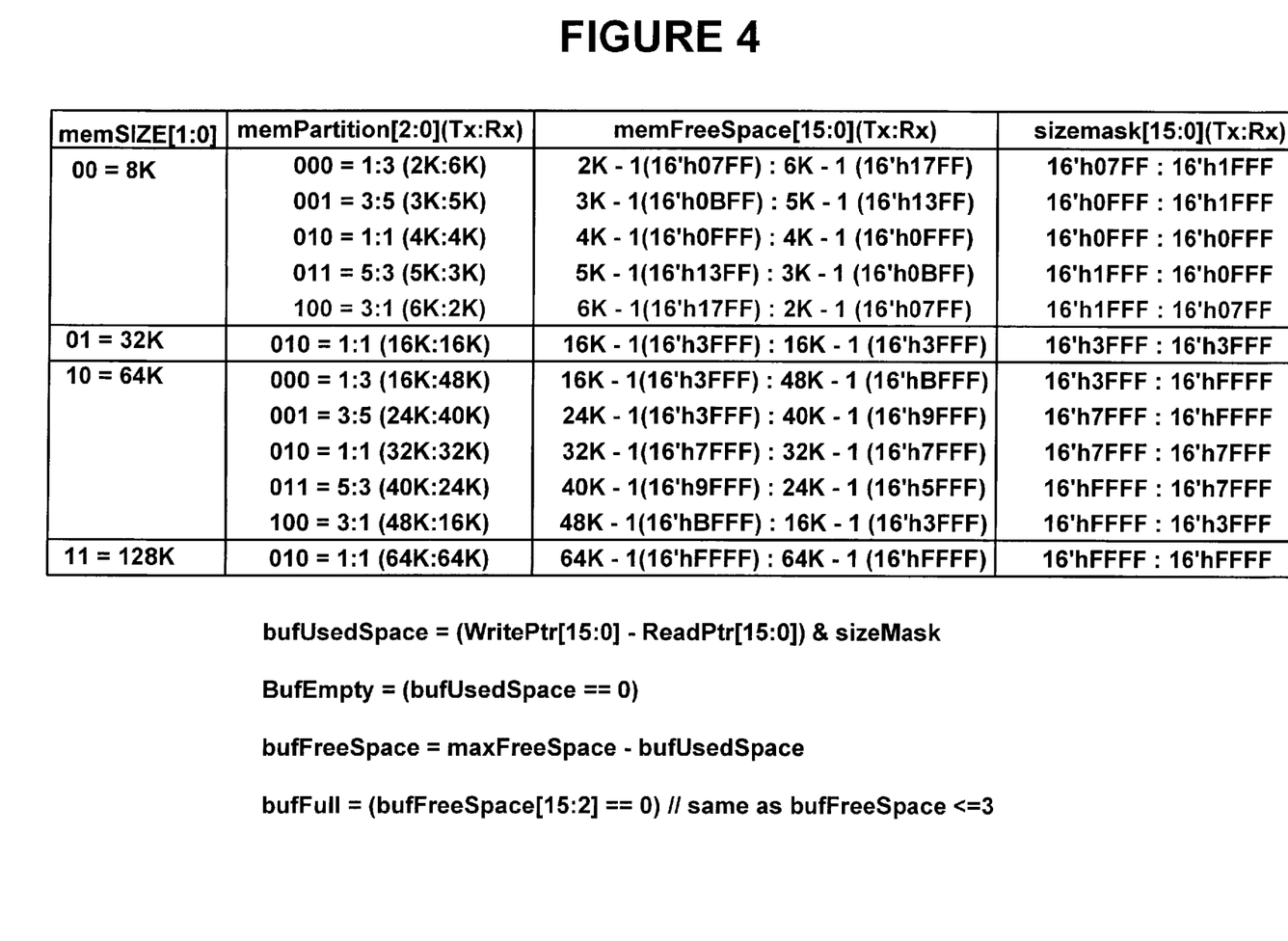
FIG. 4 presents a number of computations involved in pointer operations in accordance with an aspect of the present invention.

FIG. 4 illustrates some of the control codes and values used in pointer computations in accordance with an aspect of the present invention. In the equations at the lower part of FIG. 4, the variable BufUsedSpace indicates the amount of buffer space presently used. It is computed by subtracting the read pointer from the write pointer and ANDing sizeMask[15:0] with the result. BufEmpty indicates that the buffer is empty, in other words, BufUsedSpace=0. BufFreeSpace indicates the amount of buffer space that is free. This is calculated by subtracting BufUsedSpace from MaxFreeSpace. BufFull indicates that the buffer is full; this is the same as BufFreeSpace being less than or equal to three. In the table at the top of FIG. 4, the left hand column indicates the options for memory sizes which are specified by memsize[1:0]. An 8K buffer memory is specified by 00. A 32K buffer memory is specified by 01. A 64K buffer memory is specified by 10. A 128K buffer memory is specified by 11.

The next column indicates the possible memory partitions for particular memory sizes. An 8K buffer memory can be partitioned in the following ways: (2K:6K), (3K:5K), (4K:4K), (5K:3K) and (6K:2K). Only one possible partitioning of a 32K buffer is allowed, (16K:16K). Five partitionings of a 64K buffer are allowed, these are: (16K:48K), (24K:40K), (32K:3K), (40K:24K) and (48K:16K). Only one partitioning of a 128K memory is possible, (64K:64K).

The next column indicates the maximum free space that is allowed for each possible partitioning. This number is simply the partition size minus one.

The next and last column indicates a mask value to be used in a computation for the BufUsedSpace. This mask value is used to mask out the extraneous high order bits of a particular partition size.

Figure 5:
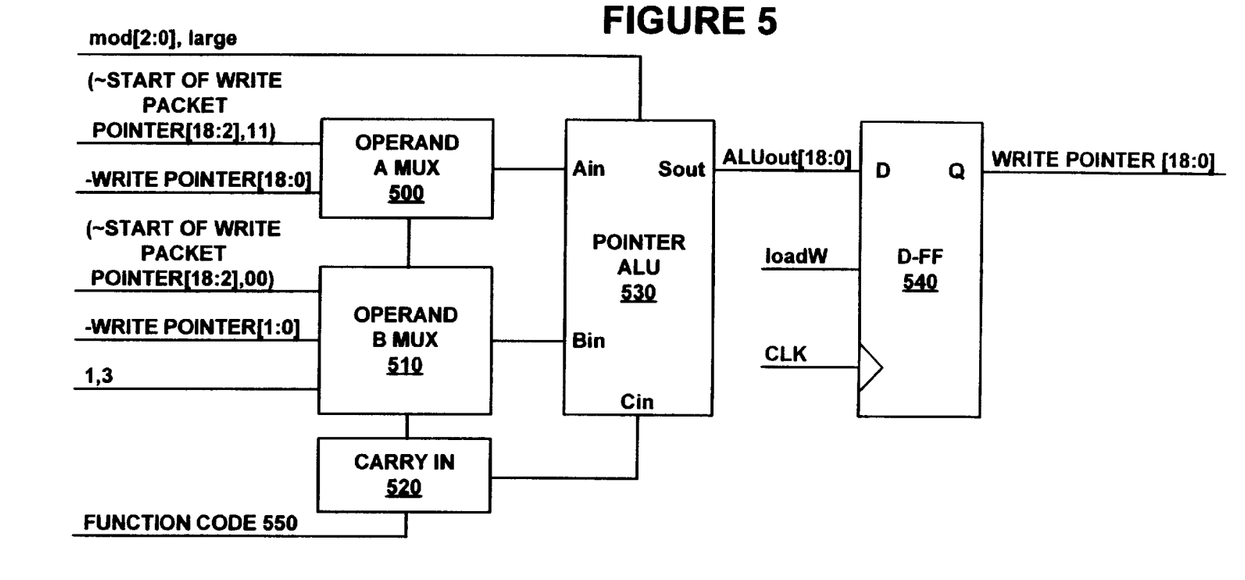
FIG. 5 is a block diagram illustrating an ALU and associated circuitry for a write pointer in accordance with an aspect of the present invention.

FIG. 5 is a circuit diagram illustrating the logic involved in performing pointer operations in accordance with an aspect of the present invention. FIG. 5 includes operand A multiplexer (MUX) 500, operand B MUX 510, carry in 520, pointer arithmetic and logic unit (ALU) 530 and D-FF 540. Pointer ALU 530 performs operations on pointers, including addition. Pointer ALU 530 is connected to, and takes inputs from, operand A MUX 500 and operand B MUX 510. Pointer ALU 530 is additionally connected to, and takes an input from, carry in 520. Pointer ALU produces an output which feeds into inputs of Dflip-flop (D-FF).

Function code signal 550 feeds into, and controls the operation of, carry in 520, operand A MUX 500 and operand B MUX 510. Function code signal 550 selectively switches operand A MUX 500 between (start of write packet pointer [18:2], 11) and write pointer[18:0]. Operand B MUX 510 selectively switches the B input of Pointer ALU 530 between (~start of write packet pointer[18:2], 00) and -write pointer[1:0], one and three. Function code signal 550 selectively switches carry in 520 between zero and one.

The above-described inputs are used to create an output from Pointer ALU 530, which feeds into D-FF 540. D-FF 540, which is a bank of D flip-flops for storing the output of pointer ALU 530. D-FF 540 includes a loadW input and clock input. When these are asserted, it produces an output which is a new value for the write pointer.

Figure 6:
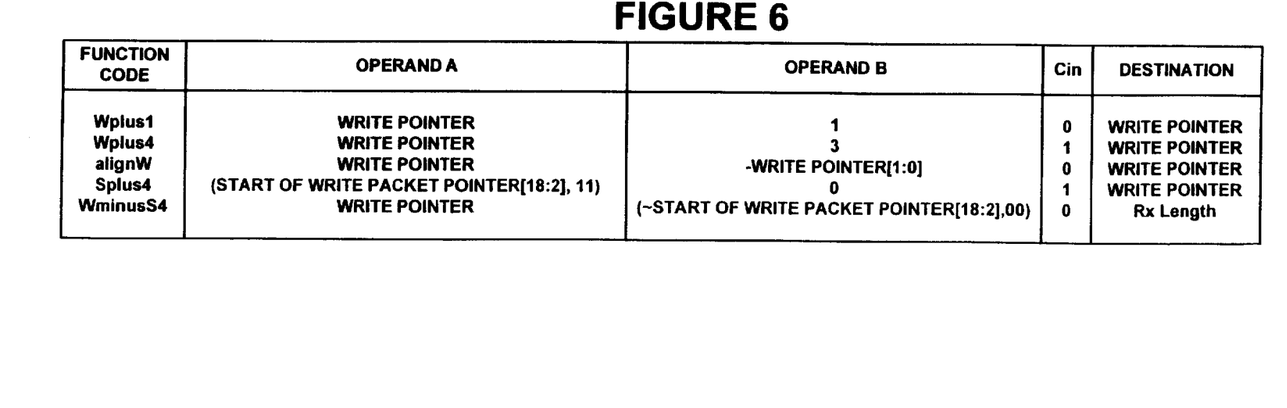
FIG. 6 is a diagram illustrating the operands involved in computations for in the circuitry illustrated in FIG. 5 in accordance with an aspect of the present invention.

FIG. 6 lists some of the operations performed by the logic illustrated in FIG. 5 in accordance with an aspect of the present invention. The Wplus1 operation takes as input the write pointer and a one value, and outputs write pointer+1. The operation Wplus4 takes as input the write pointer, a value three and a carry in, and outputs the write pointer+4. The alignW operation takes as input the write pointer and subtracts from the write pointer the lower-most two bits of the write pointer to align the write pointer to a dword boundary. The operation Splus4 takes as input (start of write packet pointer[1 8:2], 11) and carry in and outputs start of write packet pointer+4. This operation is used to reset the write pointer to discard a runt packet. The operation WminusS4 takes as input the write pointer and (~start of write packet pointer[18:2], 00) and outputs a length of a received packet.

Figure 7:
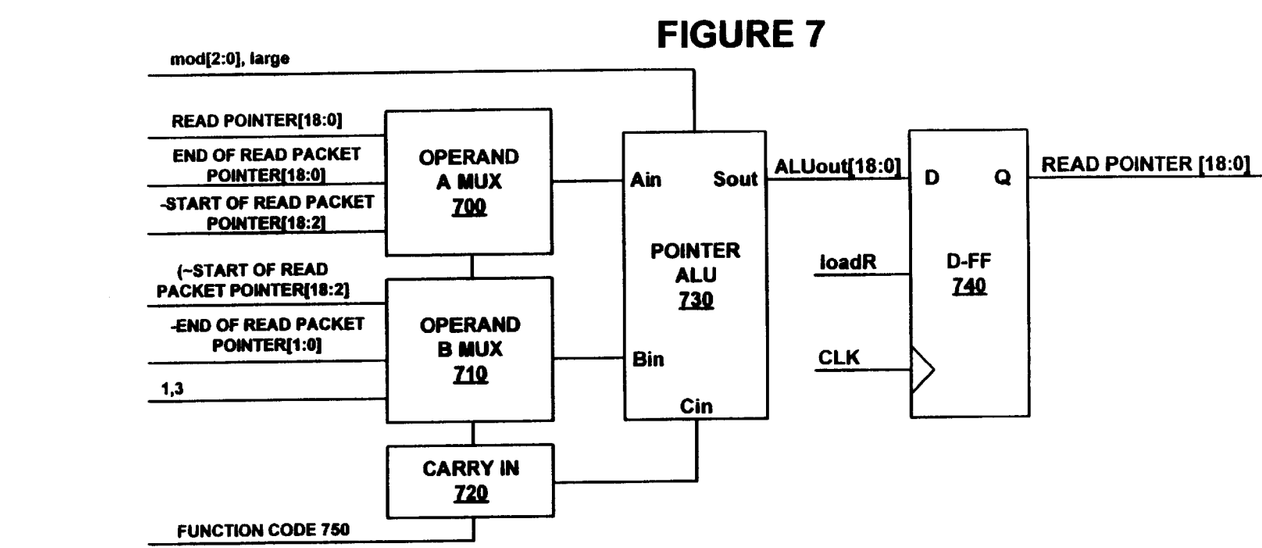
FIG. 7 is a block diagram of some of the major functional components of circuitry for performing arithmetic operations on a read pointer in accordance with an aspect of the present invention.

FIG. 7 illustrates some of the major functional components of a circuit to perform operations on a read pointer in accordance with an aspect of the present invention. FIG. 7 includes pointer ALU 730, which connects to, operand A MUX 700, operand B MUX 710, carry in 720 and D-FF 740. Pointer ALU 730 performs arithmetic operations on pointers, including addition in accordance with an aspect of the present invention. Pointer ALU 730 takes an input from operand A MUX 700 and an input from operand B MUX 710. Pointer ALU 730 takes an additional input from carry in 720 and another input from the control signals "mod[2:0]" and "large." Pointer ALU 730 uses these inputs to produce an output which is stored within D-FF 740.

Function code signal 750 controls the operation of, operand A MUX 700, operand B MUX 710 and carry in 720. Function code 750 selectively switches the A input of pointer ALU 730 between read pointer[18:0], end of read packet pointer[18:0] and start of read packet pointer[18:2]. Function code 750 selectively switches operand B MUX 710 between, ~start of read packet pointer[18:2], -end of read packet pointer[1:0], one and three. Function code 750 additionally switches carry in 720 between zero and one. Pointer ALU 730 takes these inputs and control inputs from signals mod[2:0] and large, to produce an output which feeds into D-FF 740. D-FF 740 is a bank of D flip-flops for storing the output of pointer ALU 730. D-FF 740 takes as input a LoadR signal and a clock signal. When both of these inputs are asserted, the output of pointer ALU 730 is stored within D-FF 740.

Figure 8:
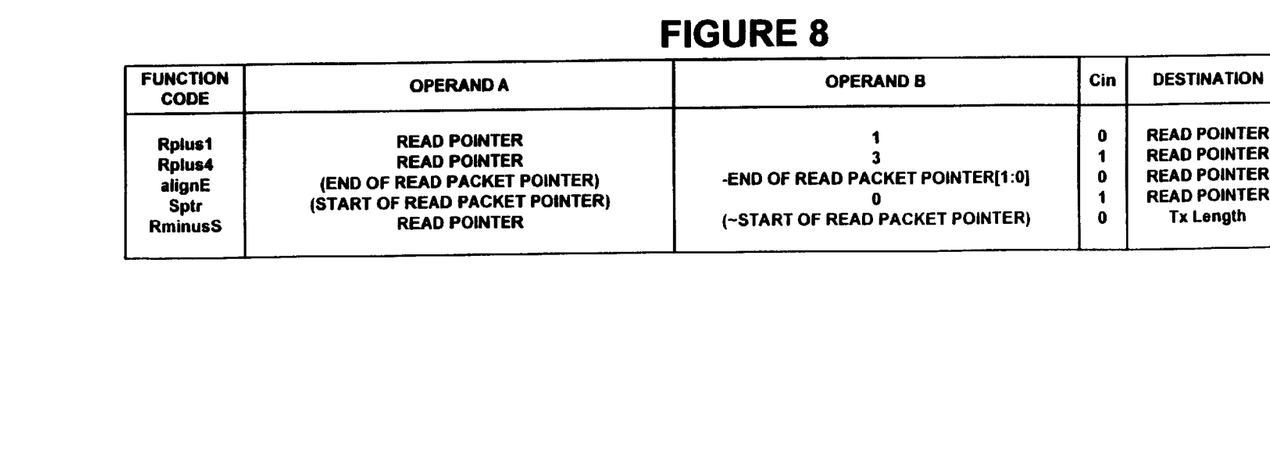
FIG. 8 illustrates the operands involved in the operations carried out by the circuitry in FIG. 7 in accordance with an aspect of the present invention.

FIG. 8 lists the operations performed by the logic circuit illustrated in FIG. 7 in accordance with an aspect of the present invention. The function Rplus1 takes as input the read pointer and a value one, and outputs read pointer+1. The function Rplus4 takes as input the read pointer, the value three and a carry in and outputs read pointer+4. The function alignE takes as input the end of read packet pointer and subtracts from this the last two bits of the end of read packet pointer to produce an output. This operation aligns the end of read packet pointer to a dword boundary. The function Sptr takes as input the start of read packet pointer and feeds this input directly to the output. This operation is used to reset the read pointer to point back to the start of the data portion of the packet currently being read in the case where a collision or other error occurs during transmission of the packet. The function RminusS takes as input the read pointer, the inverse of the start of read packet pointer and the carry in and outputs the transmit packet length.

Figure 9:
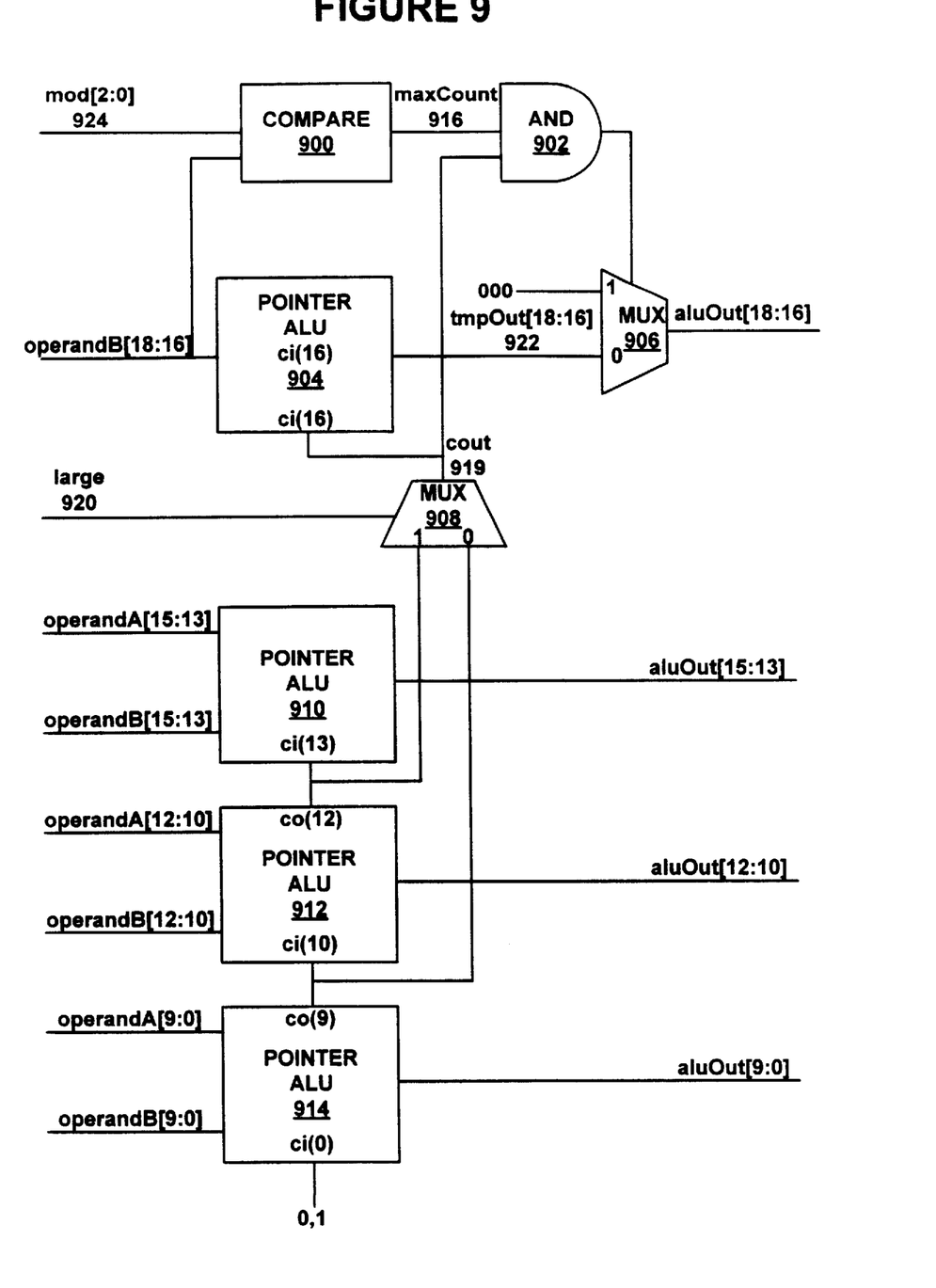
FIG. 9 is a circuit diagram of an arithmetic logic unit for performing pointer operations, including an increment operation for a buffer of selectable size, in accordance with an aspect of the present invention.

FIG. 9 is a circuit diagram of the internal structure of a pointer ALU, such as pointer ALU 530 in FIG. 5 and pointer ALU 730 in FIG. 7, in accordance with an aspect of the present invention. FIG. 9 includes compare module 900, AND gate 902, Pointer ALU 904, MUX 906, MUX 908, Pointer ALU 910, Pointer ALU 912 and Pointer ALU 914. Pointer ALU 914 takes as input the lower most ten bits of operand A[9:0] and the lower most ten bits of operand B[9:0] as well as a carry in signal and generates the lower most ten bits of aluOut[9:0]. Pointer ALU 914 also generates a carry out, which feeds into the carry in input of pointer ALU 912. Pointer ALU 912 additionally takes as inputs the next three higher bits of operand A[12:10] and the next three higher bits of operand B[12:10] and generates at its output the next three higher bits of aluOut[12:10]. Pointer ALU 912 also generates a carry out, which feeds into a carry in input of pointer ALU 910. Pointer ALU 910 additionally takes as input the three next highest bits of operand A[15:13] and the three next highest bits of operand B[15:13] and generates as an output the three next highest bits of aluOut[15:13].

The circuit so far described simply performs an addition of a 16 bit operand A[15:10] and a 16 bit operand B[15:0] to produce a 16 bit aluOut[15:0]. However, for a buffer with an adjustable boundary between transmit and receive buffers, an operation is required to reset a pointer back around to zero when it reaches the boundary between the transmit and receive buffers. This functionality is provided by, compare unit 900, AND gate 902, MUX 906, pointer ALU 904 and MUX 908. MUX 908 takes as input the carry out from pointer ALU 912, and the carry out from pointer ALU 914. It also takes the signal large 920 as a select input. The signal large 920 selectively switches the output of MUX 908 between the carry out of pointer ALU 912 and the carry out of pointer ALU 914. The carry out of pointer ALU 914 is selected if the buffer comprises 8K bytes of memory divided into 1K blocks. The carry out of pointer ALU 912 is selected if the buffer comprises 64K bytes of memory divided into 8K blocks. The output of MUX 908 is carry out 919, which feeds into both the carry in input of pointer ALU 904 and one of the inputs of AND gate 902. Pointer ALU 904 additionally takes an input from the three highest bits of operand A[18:16] and produces a three bit output tmpOut[18:16], which feeds into the zero input of MUX 906. The three highest bits of operand A[18:16] additionally feed into compare unit 900. Compare unit 900 takes an additional input from mod[2:0] 924. Compare unit 900 compares the three highest bits of operand A[18:16] with the three bits of mod[2:0] 924. If these match, it produces an output which feeds into the other input of AND gate 902. The output of AND gate 902 feeds into the select input of MUX 906. The other data input into MUX 906 is tied to three zero values. The output of MUX 906 becomes the three highest bits of aluOut[18:16]. MUX 906 selectively switches between the output of pointer ALU 904 and zero values depending upon whether or not operand A[18:16] matches mod[2:0] 924. In this way, the highest bits are reset to zero upon reaching a value which is not a power of two.

Figure 10:
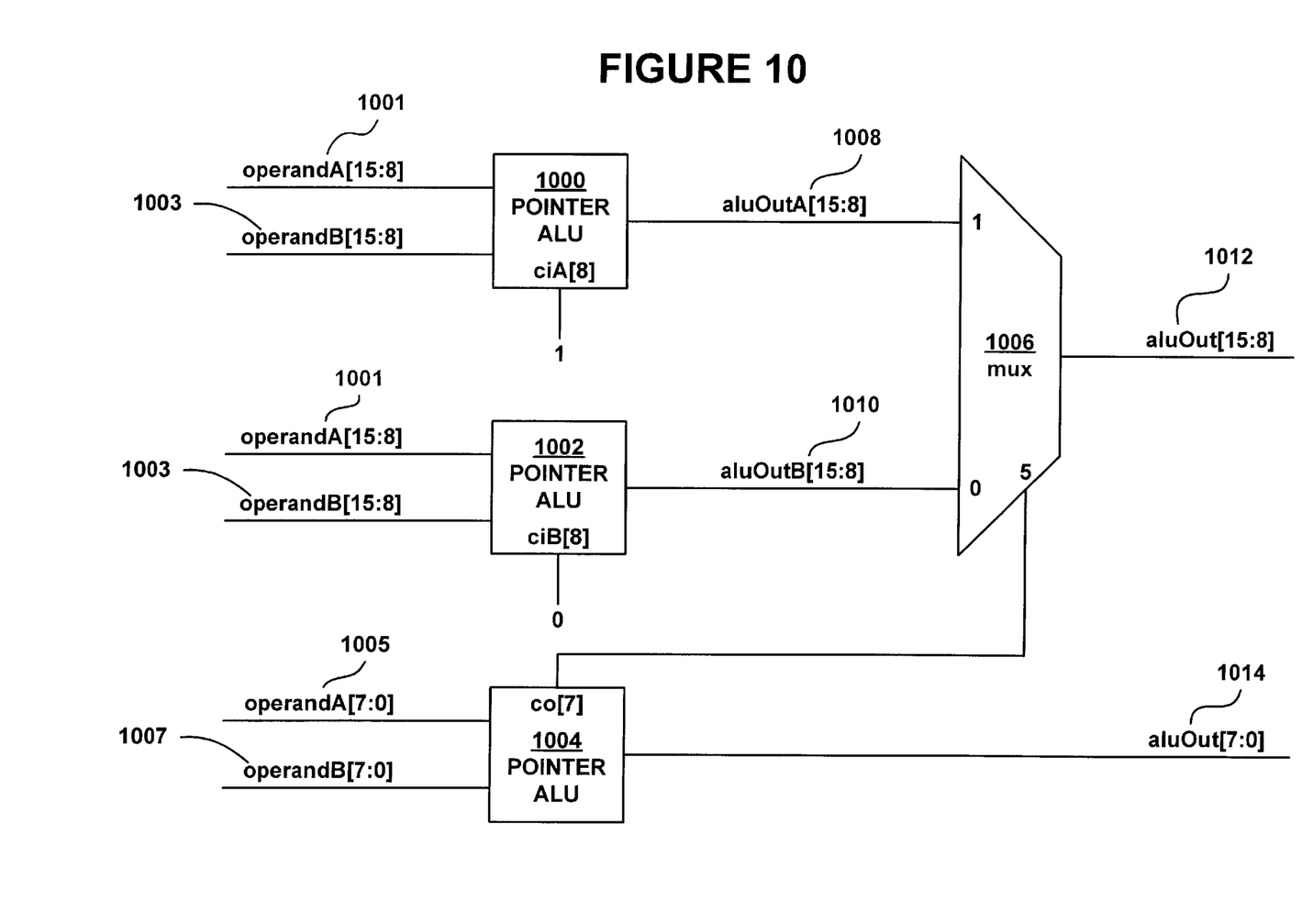
FIG. 10 is a circuit diagram illustrating an optimized carry lookahead circuit for an arithmetic logic unit in accordance with an aspect of the present invention.

FIG. 10 is a circuit diagram of a circuit which performs mathematical operations, including a circuit for speeding up the carry look ahead process in accordance with an aspect of the present invention. Circuitry presently used for the addition operation either uses a ripple carry, which is very slow, or a carry look ahead generator, which is very fast but requires a great amount of circuitry. The circuit illustrated in FIG. 10 is faster than a ripple carry circuit but requires less circuity than a carry look ahead generation circuit. The circuit in FIG. 10 includes pointer ALU 1000, pointer ALU 1002, pointer ALU 1004 and MUX 1006. Pointer ALU 1004 takes as input the lower most eight bits of operand A[7:0] 1005 and the lower most eight bits of operand B[7:0] 1007. Pointer ALU 1004 generates the lower most eight bits of aluOut[7:0] 1014. Pointer ALU 1004 additionally produces a carry out signal which feeds into the select input of MUX 1006.

Pointer ALU 1002 takes as input the highest eight bits of operand A[15:8] and the highest eight bits of operand B[15:8] 1003. Pointer ALU 1002 additionally takes in a zero value as a carry in.

Pointer ALU 1000 is identical to pointer ALU 1002 except that it receives a different carry in value at its input. Pointer ALU 1000 takes as input the highest eight bits of operand A[15:8] 1001 and the highest eight bits of operand B[15:8] 1003. These are combined with a one value at the carry in input to generate aluOutA[15:8] 1008, which feeds into the one input of MUX 1006. The output of pointer ALU 1002 is aluOutB[15:8] 1010 which feeds into the zero input of MUX 106. MUX 106 selectively switches between these two inputs depending upon the value of the carry out signal from pointer ALU 1004 to produce an output aluOut[15:8] 1012, which is the highest eight bits of the output of the circuit.

The circuit illustrated in FIG. 10 effectively performs an operation, such as an add operation between the lower most eight bits of operand A[7:0] and the lower most eight bits of operand B[7:0] in pointer ALU 1004 to produce the lower most eight bits of aluOut[7:0]. Pointer ALU 1000 performs an operation between the highest eight bits of operand A[15:8] and the highest eight bits of operand B[15:8] assuming a one value on the carry in. Pointer ALU 1002 performs an operation between the highest eight bits of operand A[15:8] and the highest eight bits of operand B[15:8] assuming a zero as a carry in value. These are computed at the same time that pointer ALU 1004 is computing the lower most eight bits. When the carry out is finally generated from pointer ALU 1004, it is used to selectively switch the output of MUX 1006 between pointer ALU 1000 and pointer ALU 1002, depending upon whether or not the carry out from pointer ALU 1004 is a zero or a one. This avoids the ripple carry delay through the highest eight bits.

Figure 11:
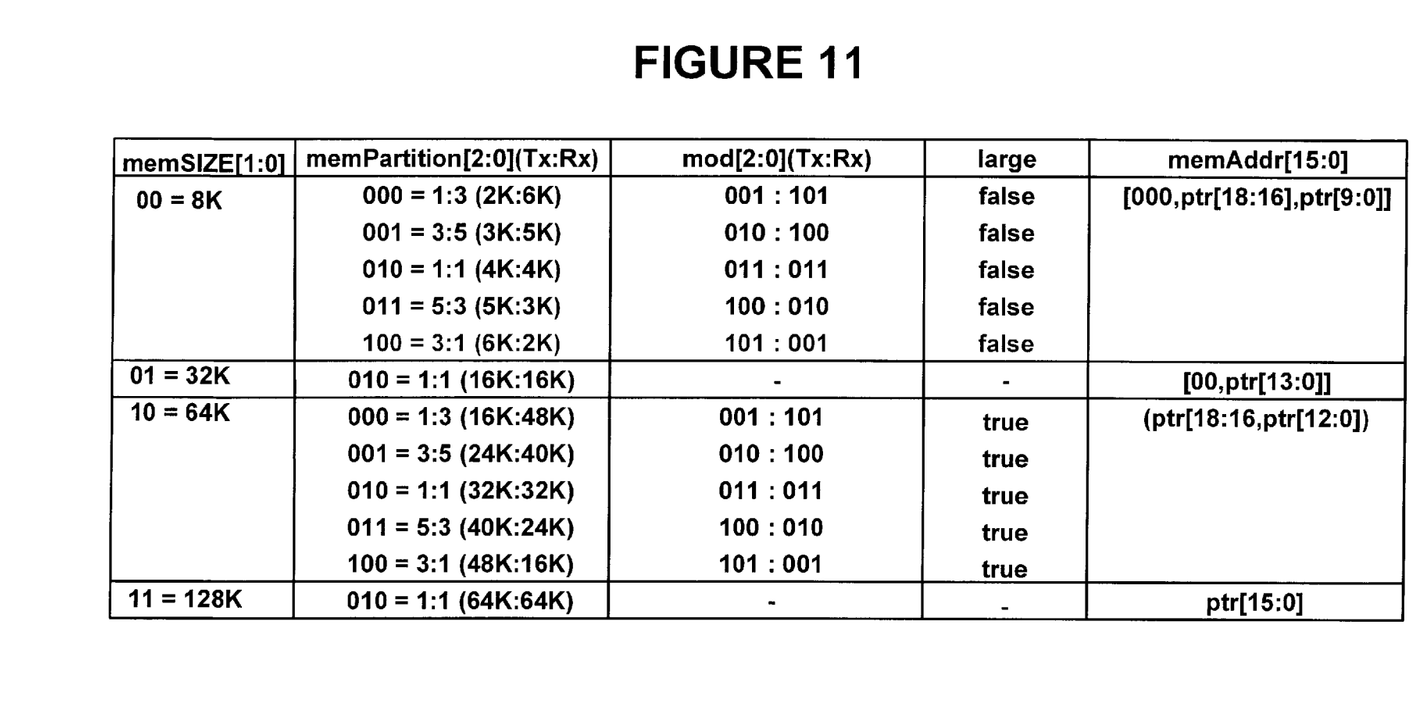
FIG. 11 presents possible configurations for the arithmetic logic unit illustrated in FIG. 9 in accordance with an aspect of the present invention.

FIG. 11 illustrates the control signals and the memory address formats associated with different memory sizes and different memory partitions in accordance with an aspect of the present invention. The left column illustrates four possible memory sizes: 8K, 32K, 64K and 128K. These are represented by memory size codes 00, 01, 10 and 11, respectively. The next column represents the various memory partition possibilities for the various buffer memory sizes. A buffer of size 8K can be partitioned as follows: (2K:6K), (3K:5K), (4K:4K), (5K:3K) and (6K:2K). These memory partition possibilities are represented by memory partition codes, 000, 001, 010, 011, and 100, respectively. For a 32K buffer, only one partitioning is possible, (16K:16K); this is represented by memory partition code 010. For memory size 64K, five partitions are possible: (16K:48K), (24K:40K), (32K:32K), (40K:24K) and (48K:16K). These are represented by memory partition codes, 000, 001, 010, 001 and 100, respectively. A buffer size of 128K can be partitioned in only one way, (64K:64K). This is represented by a memory partition code 010.

In the next column are the modulo codes associated with transmit and receive buffers. These are only effective for memory sizes 8K and 64K, which can be selectively partitioned. Memory sizes of 32K and 128K can only be partitioned in one way along power of two boundaries. Hence, no modulo counter is required. The modulo counter value represents the maximum possible value for the highest three bits of a pointer into the buffer.

The next column indicates the state of the "large" signal, which is set to a false value for the 8K buffer size and is set to a true value for the 64K buffer size. The large value is not used for the 32K and the 128K buffer sizes.

The last column on the right hand side of FIG. 11 illustrates the memory address formats associated with various memory sizes. For an 8K buffer size the three highest bits are all zero values, the three next highest bits are pointer[18:16], and the lowest ten bits are taken from the lowest ten bits of the pointer[9:0]. If the buffer is 32K in size, the highest two bits of the memory address are zero values and the lower fourteen bits are taken from the pointer[13:0]. If the buffer is 64K bytes in size, the highest three bits of the memory address are taken from the pointer [18:16] and the lower thirteen bits of the memory address are taken from the lower thirteen bits of pointer[12:0]. Finally, if the memory is 128K bytes in size, the memory address is taken from the lower sixteen bits of the pointer[15:0].

Figure 12:
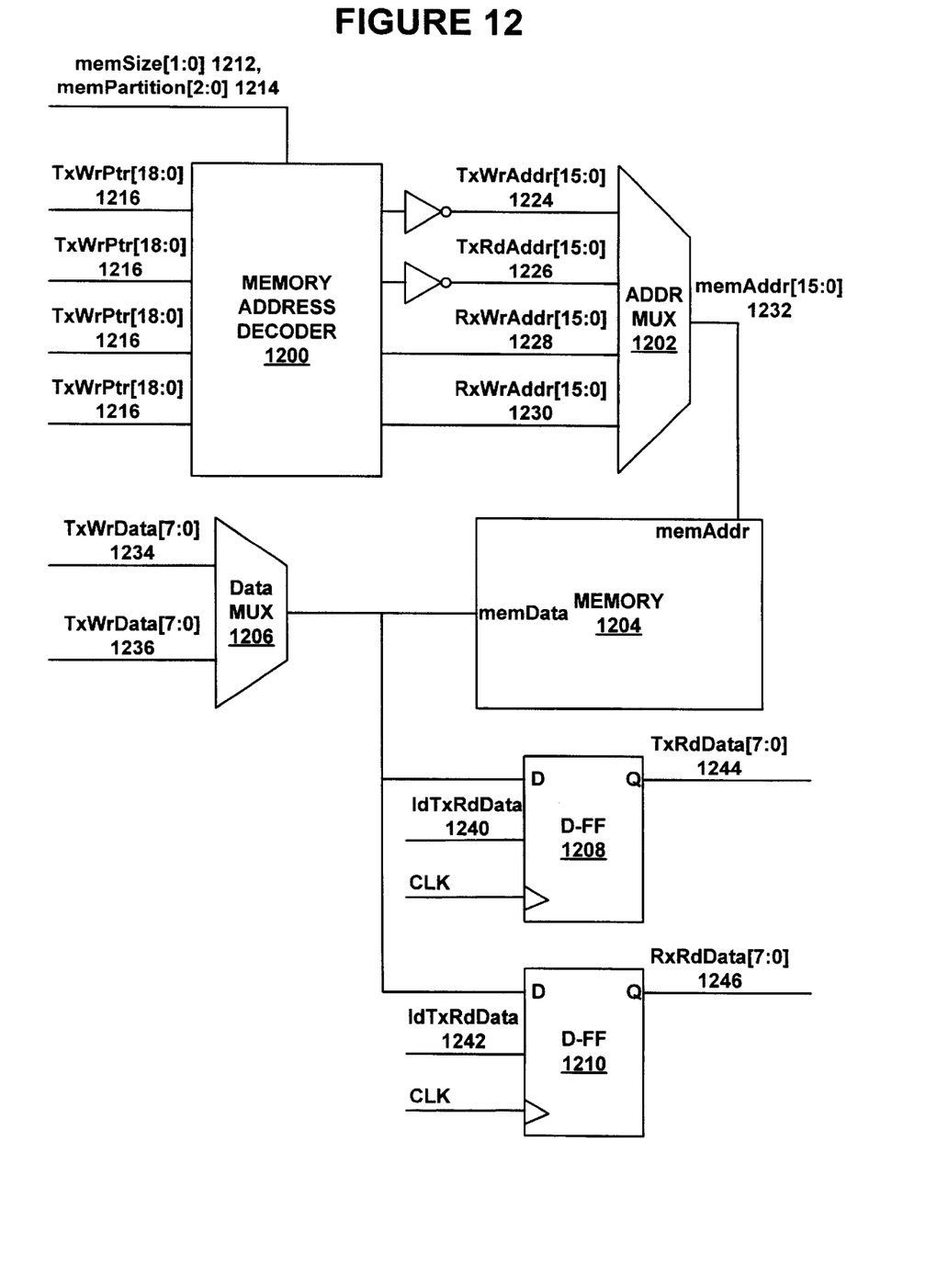
FIG. 12 is a circuit diagram of the architecture of the buffer memory in accordance with an aspect of the present invention.

FIG. 12 illustrates how the various pointers and data paths are coupled to memory 1204, in which the transmit and receive buffers are contained, in accordance with an aspect to the present invention. FIG. 12 includes memory address decoder 1200, address MUX 1202, memory 1204, data MUX 1206, D-FF 1208 and D-FF 1210. Memory address decoder 1200 takes in four pointers: transmit write pointer, transmit read pointer, receive write pointer and receive read pointer. It also takes as input memSize[1:0] and memPartition[2:0] 1214. Memory address decoder produces four addresses: transmit write address 1224, transmit read address 1226, receive write address 1228 and receive read address 1230. These feed into address MUX 1202, which selects one of these inputs as a memory address which feeds into memory 1204. Memory 1204 receives data from data MUX 1206 which selects between transmit write data 1234 and receive write data 1236. Data read from memory 1204 feeds into D-FF 1208, which contains the transmit read data. It also feeds into D-FF 1210, which contains receive read data 1246. The circuitry in FIG. 12 operates under control of controller 125 in FIG. 1.

The foregoing description of embodiments of the invention have been presented for purposes of illustration and description only. They are not intended to be exhaustive or to limit the invention to the forms disclosed. Obviously, many modifications and variations will be apparent to practitioners skilled in the art.

What is claimed is:

1. An apparatus for partitioning a buffer memory in an interface to a network, comprising:
   a memory comprising,
      a transmit buffer that includes addresses designated by a start of read packet pointer, a read pointer, and an end of read packet pointer, wherein the read pointer progresses in a first direction through the addresses, wherein the end of read packet pointer includes an address; and
      a receive buffer that includes addresses designated by a start of write packet pointer, and a write pointer, wherein the write pointer progresses in a second direction through the addresses toward the read pointers;

wherein an address at which the read pointer and the write pointer meet is a boundary between the transmit buffer and the receive buffer that determines a size of the transmit buffer and a size of the receive buffer, wherein the memory is configurable to preselect a size range of the transmit buffer and a size range of the receive buffer; and a controller coupled to the memory, comprising, first circuitry for generating a new write pointer, comprising an arithmetic and logic unit that performs operations on the start of write packet pointer, and the write pointer; and second circuitry for generating a new read pointer, comprising an arithmetic and logic unit that performs operations on the start of read packet pointer, the end of read packet pointer, and the read pointer.

2. The apparatus of claim 1, wherein:

the first circuitry further performs operations to reset the write pointer to an initial value when the write pointer reaches the boundary; and the second circuitry further performs operations to reset the read pointer to an initial boundary when the read pointer reaches the boundary.

3. An apparatus as in claim 1, wherein the memory is configurable through execution of software instructions at initialization of the buffer memory.

4. An apparatus as in claim 1, wherein the memory is configurable through setting a hardware jumper.

5. An apparatus as in claim 1, wherein the controller is configured to prevent an incomplete write packet from being written to the buffer memory, including determining that a complete write packet will not be written to available space in the buffer memory, resetting the start of write pointer to a location stored in the start of write packet pointer, and discarding the incomplete write packet.

6. An apparatus as in claim 1, wherein the controller is configured to determine when a read packet is completely read, including comparing the read pointer with the end of read packet pointer.

7. A network interface card for interfacing between a network device that is coupled to a bus, comprising:

a bus interface circuit coupled to the bus;

a memory coupled to the bus interface circuit, wherein the memory is configurable to include a transmit buffer of a certain size range and a receive buffer of a certain size range, wherein, the transmit buffer that includes addresses designated by a start of read packet pointer, a read pointer, and an end of read packet pointer, wherein the read pointer progresses in a first direction through the addresses, and wherein the end of read packet pointer includes an address;

the receive buffer that includes addresses designated by a start of write packet pointer, and a write pointer, wherein the write pointer progresses in a second direction through the addresses toward the read pointer; and wherein an address at which the read pointer and the write pointer meet is a boundary between the transmit buffer and the receive buffer that determines a size of the transmit buffer and a size of the receive buffer; and a controller coupled to the memory, comprising, first circuitry for generating a new write pointer, comprising an arithmetic and logic unit that performs operations on the start of write packet pointer, and the write pointer;

second circuitry for generating a new read pointer, comprising an arithmetic and logic unit that performs operations on the start of read packet pointer, the end of read packet pointer, and the read pointer, wherein the first circuitry further performs operations to reset the write pointer to an initial value when the write pointer reaches the boundary, and the second circuitry further performs operations to reset the read pointer to an initial boundary when the read pointer reaches the boundary;

circuitry for preventing an incomplete write packet from being written to the buffer memory, wherein preventing includes determining that a complete write packet will not be written to available space in the buffer memory, resetting the start of write pointer to a location stored in the start of write packet pointer, and discarding the incomplete write packet; and circuitry for determining when a read packet is completely read, wherein determining includes comparing the read pointer with the end of read packet pointer and;

a media interface control circuit coupled to the memory, the controller, and the network.

8. A method for controlling relative sizes of a transmit buffer and a receive buffer in a memory of a fixed size in a network interface card, comprising:

preconfiguring the relative sizes by specifying a size range for the transmit buffer and a size range for the transmit buffer;

generating a write pointer that points to a location of the receive buffer currently written to, wherein the write pointer points to a succession of addresses in a first direction in the memory;

generating a read pointer that points to a location of the transmit buffer currently written to, wherein the read pointer points to a succession of addresses in a second direction in the memory;

when the write pointer reaches an address adjacent to the read pointer, resetting the write pointer to an initial write pointer address;

when the write pointer reaches an address that indicates the limit of the size range for the receive buffer, resetting the write pointer to the initial write pointer address;

when the read pointer reaches an address adjacent to the write pointer, resetting the read pointer to an initial read pointer address;

when the read pointer reaches an address that indicates the limit of the size range for the transmit buffer, resetting the read pointer to the initial read pointer address; and determining when a read packet is completely read, including comparing an address of the read pointer with an address of an end of read packet pointer.

* * * * *